(12) United States Patent
Yoo et al.

(10) Patent No.: US 8,046,432 B2
(45) Date of Patent: Oct. 25, 2011

(54) NETWORK CACHING FOR MULTIPLE CONTEMPORANEOUS REQUESTS

(75) Inventors: Won Suk Yoo, Redmond, WA (US); Anil K. Ruia, Issaquah, WA (US); Himanshu Patel, Redmond, WA (US); John A. Bocharov, Seattle, WA (US); Ning Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 265 days.

(21) Appl. No.: 12/425,395

(22) Filed: Apr. 17, 2009

(65) Prior Publication Data

US 2010/0268789 A1   Oct. 21, 2010

(51) Int. Cl.
  *G06F 15/16* (2006.01)
  *G06F 15/167* (2006.01)
(52) U.S. Cl. ..................... 709/217; 709/213
(58) Field of Classification Search .............. 709/213, 709/217
  See application file for complete search history.

(56) References Cited

U.S. PATENT DOCUMENTS

| | | | |
|---|---|---|---|
| 6,553,411 B1 * | 4/2003 | Dias et al. | 709/219 |
| 7,240,100 B1 | 7/2007 | Wein et al. | |
| 7,359,955 B2 | 4/2008 | Menon et al. | |
| 2006/0112176 A1 | 5/2006 | Liu et al. | |
| 2007/0156845 A1 | 7/2007 | Devanneaux et al. | |
| 2007/0250552 A1 | 10/2007 | Lango et al. | |
| 2008/0222281 A1 | 9/2008 | Dilley et al. | |

OTHER PUBLICATIONS

"Content Delivery Network", retrieved at <<http://en.wikipedia.org/wiki/Content_Delivery_Network>>, pp. 6.
Yu, et al., "A Scalable Web Cache Consistency Architecture", retrieved at <<http://ce.sejong.ac.kr/~shindk/022_gpe/papers/A%20scalable%20Web%20cache%20consistency%20architecture.pdf>>, SIGCOMM, 99, pp. 12.
Gayek, et al., "A Web Content Serving Utility", retrieved at <<http://www.research.ibm.com/journal/sj/431/gayek.html>>, vol. 43, No. 1, 2004, pp. 16.
Wessels, et al., "RFC2187—Application of Internet Cache Protocol (ICP), Version", retrieved at <<http://www.faqs.org/rfcs/rfc2187.html>>, Sep. 1997, pp. 19.

\* cited by examiner

*Primary Examiner* — George Neurauter
(74) *Attorney, Agent, or Firm* — Boswell IP Law; J. Mason Boswell

(57) ABSTRACT

A live caching system is described herein that reduces the burden on origin servers for serving live content. In response to receiving a first request that results in a cache miss, the system forwards the first request to the next tier while "holding" other requests for the same content. If the system receives a second request while the first request is pending, the system will recognize that a similar request is outstanding and hold the second request by not forwarding the request to the origin server. After the response to the first request arrives from the next tier, the system shares the response with other held requests. Thus, the live caching system allows a content provider to prepare for very large events by adding more cache hardware and building out a cache server network rather than by increasing the capacity of the origin server.

20 Claims, 4 Drawing Sheets

NETWORK CACHING FOR MULTIPLE CONTEMPORANEOUS REQUESTS

BACKGROUND

Streaming media is multimedia that is constantly received by, and normally presented to, an end-user (using a client) while it is being delivered by a streaming provider (using a server). Several protocols exist for streaming media, including the Real-time Streaming Protocol (RTSP), Real-time Transport Protocol (RTP), and the Real-time Transport Control Protocol (RTCP), which are often used together. The Real Time Streaming Protocol (RTSP), developed by the Internet Engineering Task Force (IETF) and created in 1998 as Request For Comments (RFC) 2326, is a protocol for use in streaming media systems, which allows a client to remotely control a streaming media server, issuing VCR-like commands such as "play" and "pause", and allowing time-based access to files on a server.

The sending of streaming data itself is not part of the RTSP protocol. Most RTSP servers use the standards-based RTP as the transport protocol for the actual audio/video data, acting somewhat as a metadata channel. RTP defines a standardized packet format for delivering audio and video over the Internet. RTP was developed by the Audio-Video Transport Working Group of the IETF and first published in 1996 as RFC 1889, and superseded by RFC 3550 in 2003. The protocol is similar in syntax and operation to Hypertext Transport Protocol (HTTP), but RTSP adds new requests. While HTTP is stateless, RTSP is a stateful protocol. A session ID is used to keep track of sessions when needed. RTSP messages are sent from client to server, although some exceptions exist where the server will send messages to the client.

RTP is usually used in conjunction with RTCP. While RTP carries the media streams (e.g., audio and video) or out-of-band signaling (dual-tone multi-frequency (DTMF)), RTCP is used to monitor transmission statistics and quality of service (QoS) information. RTP allows only one type of message, one that carries data from the source to the destination. In many cases, there is a need for other messages in a session. These messages control the flow and quality of data and allow the recipient to send feedback to the source or sources. RTCP is a protocol designed for this purpose. RTCP has five types of messages: sender report, receiver report, source description message, bye message, and application-specific message. RTCP provides out-of-band control information for an RTP flow and partners with RTP in the delivery and packaging of multimedia data, but does not transport any data itself. RTCP is used periodically to transmit control packets to participants in a streaming multimedia session. One function of RTCP is to provide feedback on the quality of service being provided by RTP. RTCP gathers statistics on a media connection and information such as bytes sent, packets sent, lost packets, jitter, feedback, and round trip delay. An application may use this information to increase the quality of service, perhaps by limiting flow or using a different codec or bit rate.

One of the techniques for achieving high scalability is using cache proxies that are distributed near the network endpoints. Such network cache proxies are known as a Content Delivery Network (CDN) or Edge Cache Network (ECN). A CDN is a network of tiered cache nodes that can be used to distribute the content delivery. A CDN is most commonly used to reduce the network bandwidth, reduce the load on the origin server(s), and increase the response time of content delivery. A CDN tries to accomplish these objectives by serving the content from a cache node that is closest to the request that has requested the content. Each caching layer serves as a "filter" by caching and serving the requested content without having to go to the origin server (such as a web server) for every request. The Internet has built up a large infrastructure of caching proxies (and network routers with caching capabilities) that are effective at caching data for HTTP. Servers can provide cached data to clients with less delay and by using fewer resources than re-requesting the content from the original source. For example, a user in New York may download a content item served from a host in Japan, and receive the content item through a caching proxy in California. If a user in New Jersey requests the same file, the caching proxy in California may be able to provide the content item without again requesting the data from the host in Japan. This reduces the network traffic over possibly strained routes, and allows the user in New Jersey to receive the content item with less latency.

While this solution works for on-demand content, the same solution does not work for live content because live content is not available in cache proxies (by the virtue of being live content). So for streaming a live broadcast, such as watching a live NFL game in real-time, CDNs/ECNs cannot leverage their HTTP caching proxies, because a cached response is not available at the time users request the data. Instead, CDNs/ECNs deploy and manage proprietary media streaming servers, which significantly increases the cost of the solution to content providers. Attempting to deliver live broadcasts with existing caching proxy solutions would have the following effects. When the request arrives at the edge cache server, it results in a cache-miss. The edge server forwards the request to the parent cache server and the request, again, results in a cache-miss. The result is that the request reaches the origin server to get the content.

In a live broadcast scenario, if 10 million users are requesting to view, for example, the opening ceremony of the Olympics, then there are 10 million cache misses, and all 10 million requests will be forwarded to the origin server, which, without the capacity to handle the 10 million requests, will crash or at least perform very poorly. Networks of proprietary streaming servers managed by CDNs/ECNs are limited in scale relative to networks of caching proxies, which often results in a lack of capacity for events with large viewership, such as the 2009 U.S. Presidential Inaugurations. Thus, the lack of caching limits the number of contemporaneous viewers and requests that the servers can handle, and thereby limits the attendance of a live event. The world is increasingly using the Internet to consume live information, such as the record number of users that watched the opening of the 2008 Olympics via the Internet. The limitations of current technology are slowing adoption of the Internet as a medium for consuming this type of media content.

SUMMARY

A live caching system is described herein that reduces the burden on origin servers for serving live content by holding requests at edge servers when those requests are redundant based on one or more earlier requests. In response to receiving a first request that results in a cache miss, the system forwards the first request to the next tier while "holding" other requests for the same content. If the system receives a second request while the first request is pending, the system will recognize that a similar request is outstanding and hold the second request by not forwarding the request to the origin server. After the response to the first request arrives from the next tier, the system shares the response with other held requests. Later requests for the same content will result in a cache hit and continue to be served from the cache, so what begins as live content is cached to automatically be available later as on-demand content. The system reduces network consumption between cache servers and the origin server, lowers the resource requirements of the origin server, and provides caching not previously available to live content. Thus, the live caching system allows a content provider to prepare for very large events by adding more cache hardware and building out a cache server network rather than by increasing the capacity of the origin server or investing in proprietary streaming networks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
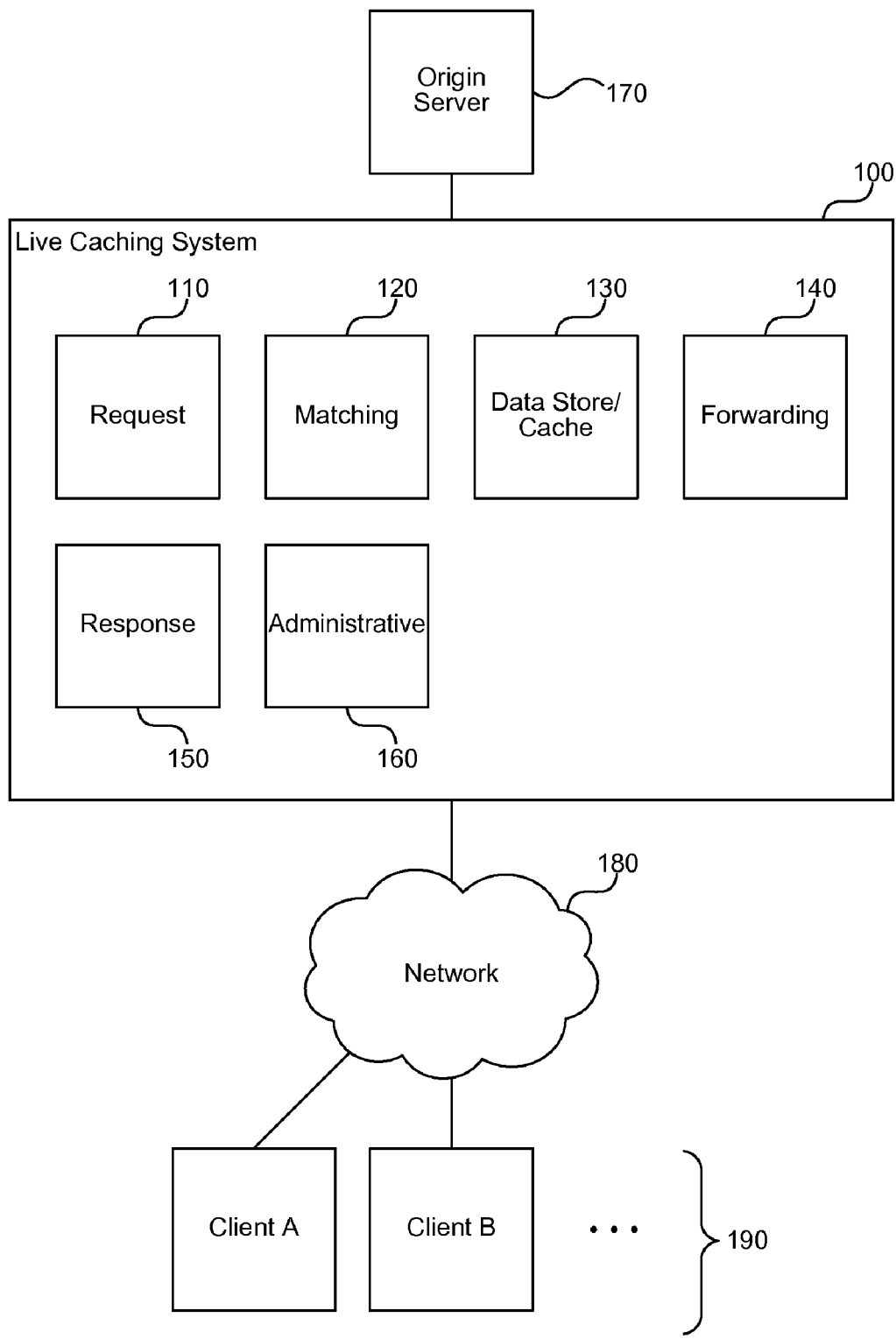
FIG. 1 is a block diagram that illustrates components of the live caching system, in one embodiment.

A live caching system is described herein that reduces the burden on origin servers for serving live content by holding requests at edge servers when those requests are redundant based on one or more earlier requests. The system addresses the problems and limitations with cache proxies and CDNs/ECNs with respect to serving live content by consolidating live requests. In response to receiving a first request that results in a cache miss, the system forwards the first request to the next tier while "holding" other requests for the same content. For example, if a first viewer of a live event sends an HTTP request to a web server that serves audiovisual content for the event for which the system is providing caching, the first viewer's request will result in a cache miss at a cache server and the system will forward the request to the web server. If a second viewer sends a second request for the same content, the cache server will recognize that a similar request is outstanding and hold the second request at the cache server by not forwarding the request to the origin server. After the response to the first request arrives from the next tier, the system shares the response with other held requests. In the previous example, the system will respond to the first viewer's request and the second viewer's request based on the single received response from the web server. Later requests for the same content will result in a cache hit and continue to be served from the cache, so what begins as live content is cached to automatically be available later as on-demand content.

Note that in this example, the origin server receives only one request and thus can provide service to a higher number of viewers. The system reduces network consumption between the cache servers and origin server, lowers the resource requirements of the origin server, and provides caching not previously available to live content. Although the system helps the live broadcasting scenario, system implementers can use the same technique for any content for network bandwidth reduction in addition to other, existing caching techniques. The system magnifies the reduction of consumed bandwidth for large, contemporaneous demand for uncached content, such as live broadcasts. The same effect also operates at multiple tiers. For example, a first tier of cache servers closest to the origin server will reduce the load on the origin server, a second tier of cache servers further away from the origin server will reduce the load on the first tier of servers, and so forth. In addition, the system allows servers that would not previously have been likely origins for content to provide content for a large collection of viewers. Thus, the live caching system allows a content provider to prepare for very large events by adding more cache hardware and building out a cache server network rather than by increasing the capacity of the origin server or investing in proprietary streaming networks. Building a cache server network is preferable to increasing the capacity of the origin server for several reasons. First, multiple origin servers can share the cache network, providing a higher return on investment. Second, the cache network improves both live and on-demand performance, so content providers that have already built out a cache network for on-demand performance receive increased performance in live scenarios without an extra investment in hardware.

FIG. 1 is a block diagram that illustrates components of the live caching system, in one embodiment. The system 100 includes a request component 110, a matching component 120, a data store component 130, a forwarding component 140, a response component 150, and an administrative component 160. Each of these components is described in further detail herein. The system 100 may comprise one or more cache servers, and one or more tiers of cache servers. The system 100 communicates with an origin server 170 that provides content to the system 100 that is not available from the system 100 cache. One or more clients 190 connect to the system 100 via a network 180, such as the Internet. The origin server 170 may also connect to the system 100 via a network (not shown), which may be the same network 180 as that accessed by clients 190 or a different network (e.g., a private local area network (LAN)). In some embodiments, the system 100 is provided as an add-on module to an existing web server system (e.g., Microsoft Internet Information Server (IIS) or Apache). For example, the Microsoft IIS Application Request Routing (ARR) add-on can be expanded to include the system 100 described herein.

The request component 110 receives requests for content from clients over a network. For example, when the system is operating as an HTTP cache, then the request component 110 receives HTTP GET requests that specify a Uniform Resource Locator (URL) that a client is requesting to retrieve. When the component 110 receives the request, it may parse the protocol to retrieve the URL and pass the URL to the matching component 120 to determine whether there is a matching cache item. When requested content is available in the cache (and is not expired), the system 100 responds to the request with the cached item. When requested content is not in the cache (or is expired), the system 100 forwards the request to the next tier, which may include additional cache servers or one or more origin servers, to obtain the requested content through the forwarding component 140 described herein.

The matching component 120 receives a key with which to look up items in a cache stored by the system 100. The key may include a URL or other identifier that identifies cached content as responsive to a particular request. For example, for HTTP caching, the key is a URL, and the matching component 120 determines whether content matches a received request based on the URL in the request and a URL associated with each cache item. If a received key matches a cached item, then the matching component 120 provides the matching item for the system 100 to use in a response to the request. If the received key does not match any cache items, then the matching component 120 provides a response to the requesting layer of the system that the item is not in the cache.

The data store component 130 stores cache items and configuration information for the system 100. The data store component 130 may include one or more databases, disk-based storage, memory, Storage Area Networks (SANs), and so forth. The data store component 130 stores responses to previous requests and provides fast access to respond to subsequent requests from the cache rather than forwarding a request to the origin server or other next tier server. By storing data and responding from the cache, the data store component 130 reduces the load on other servers that are relied from receiving and responding to at least some requests.

The forwarding component 140 forwards requests for content that is not available in the cache to the next tier for responding to a received request. The forwarding component 140 may use well known Internet routing rules for identifying the next server that will receive the request, or a content provider may build a CDN that specifies a well-defined hierarchy of cache servers and origin servers for providing content. The forwarding component 140 forwards the request and waits for the response. When the response arrives (or fails to arrive, such as due to a lost connection), the response component 150 handles the response.

The system 100 introduces a delay to subsequent requests for the same content as an outstanding request. Thus, when the system 100 receives a request for a particular content item, e.g., based on a URL, the system stores information about the request, such as by placing a placeholder or other marker in the cache that will be found by subsequent requests. When a subsequent request for the same content arrives, the system holds the request instead of forwarding it also. For example, if the system 100 marks the cache, then an arriving request for a particular URL causes the matching component 120 to look up a content item associated with a matching URL in the cache, finds the placeholder, and knows to wait for the prior request to finish. The subsequent request may register for a notification or otherwise make itself available (e.g., by storing the request in a list or hash table) so that when the response to the first request arrives, the subsequent request will also receive the response.

The response component 150 receives forwarded responses from the origin server or other next tier server and provides the responses to pending requests. The response is associated with a particular request, and the component 150 identifies that request and provides the response so that the system 100 can reply to the original requestor. In addition, the response component 150 identifies other waiting requests that the system 100 held in lieu of forwarding additional requests for the same content. For example, the waiting requests may be associated with a cache placeholder for the content, or on a list of pending requests. The response component 150 provides the response to each request so that each requestor receives the response. The response component 150 may also store the response in the cache so that the system 100 can serve subsequent requests from the cache. Thus, when many requests for the same content arrive during a short period, the system 100 reduces the burden on the origin server and/or other next tier servers by holding some requests. In addition, held requests may actually receive an earlier response than they otherwise would have because held requests receive the response of the first request, rather than waiting for subsequent responses (which would have further slowed the responsiveness of the origin server).

The administrative component 160 provides an administrative interface to the system 100 to receive configuration information and provide status information. An administrator can configure whether the system holds requests as described herein, how long the system holds requests before sending additional requests, an expiration policy of the cache, one or more servers that a particular server communicates with for forwarding requests, and so forth. An administrator can also receive information, such as historical data about the requests received by a server, the number of responses, whether responses were from the cache (a cache hit) or forwarded (a cache miss), whether requests were held to reduce the burden on the origin server, and so forth.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
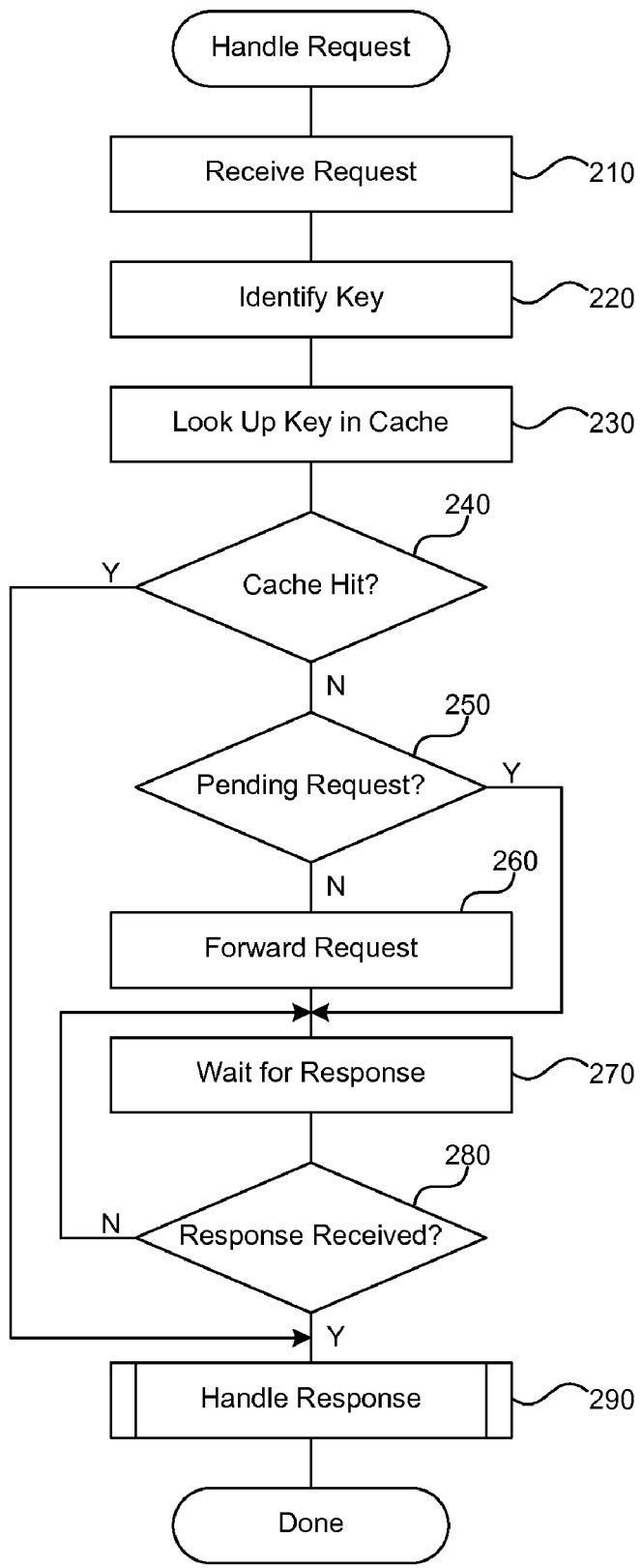
FIG. 2 is a flow diagram that illustrates the processing of the system in response to receiving a request, in one embodiment.

FIG. 2 is a flow diagram that illustrates the processing of the system in response to receiving a request, in one embodiment. The system typically receives requests directly from clients or indirectly from clients through another tier of cache servers. Beginning in block 210, the system receives a request for content. Typically, the request includes information that distinguishes the requested content from other content. For example, an HTTP GET request includes a URL that, when combined with the destination server in the underlying TCP data, identifies the requested content. Continuing in block 220, the system identifies a cache key based on the distinguishing information in the request. The system may use the distinguishing information directly as the cache key, or may compute a derived key (e.g., using a hashing algorithm) based on the distinguishing information.

Continuing in block 230, the system looks up the identified key in the cache, to determine whether the requested content is stored in the cache. For example, the cache may include a hash table, and the key may act as a hash value. Continuing in decision block 240, if the requested content is in the cache (i.e., a cache hit), then the system jumps to block 290 to provide a response to the request based on the cached content, else the system continues at block 250. Continuing in decision block 250, the system determines whether there is a similar pending request. If there is a similar pending request, then the system jumps to block 270 to wait for the response, else the system continues at block 260 to forward the request. For example, the system may determine whether there is a similar pending request by looking for other requests associated with the same cache key.

Continuing in block 260, the system forwards the request to another server that can provide the content that was not available in the cache. For example, the server may include an origin server or another cache server that may have the requested content. Continuing in block 270, the system waits for a response to the forwarded request. For example, the system may block on an operating system call waiting for a response. Continuing in decision block 280, if no response has been received, then the system loops to block 270 to continue waiting, else the system continues at block 290. Continuing in block 290, the system provides a response to the request. The response may come from the cache or from a forwarded request based on the previous steps. The response responds to the original request as well as any held requests that were waiting on the pending response. After block 290, these steps conclude.

Figure 3:
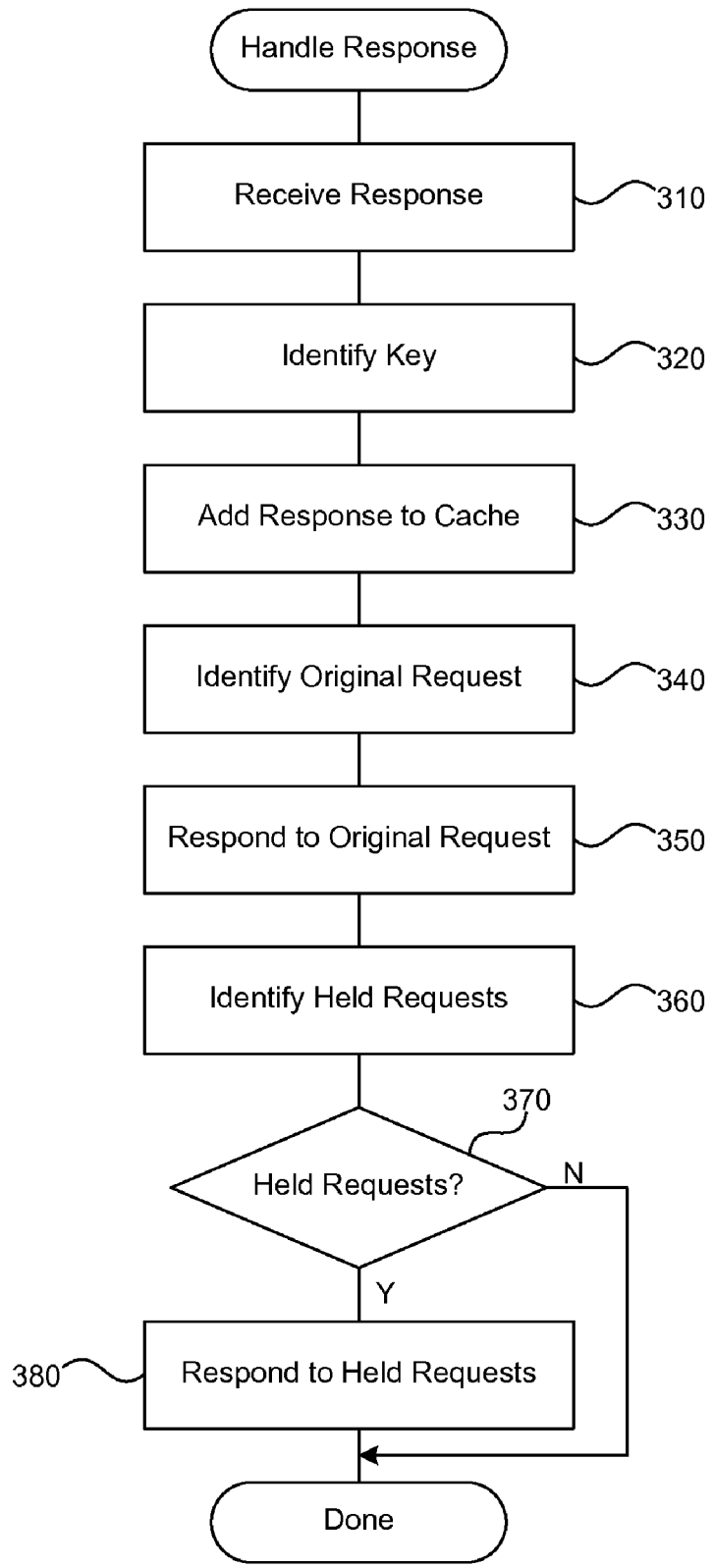
FIG. 3 is a flow diagram that illustrates the processing of the system in response to receiving a response, in one embodiment.

FIG. 3 is a flow diagram that illustrates the processing of the system in response to receiving a response, in one embodiment. Typically, the system receives responses from an origin server or from a cache server closer to the origin server based on a previously forwarded request. Beginning in block 310, the system receives a response to the forwarded request. The response may include a content item requested in the forwarded request. For example, if the request was an HTTP GET request, then the response provides a standard HTTP response (e.g., 200 OK) indicating whether the request succeeded and if so providing the requested HTTP content. Continuing in block 320, the system identifies a key associated with the response. For example, the key may be the same key used as a cache key with reference to FIG. 2, such as a URL or hash value.

Continuing in block 330, the system adds the response to the cache based on the identified key. Adding the response to the cache allows subsequent requests to respond directly from the cache without forwarding a new request or waiting for an existing forwarded request. This improves the latency of subsequent requests as well as lowering the resource burdens on the servers to which the system forwards requests. Continuing in block 340, the system identifies an original request associated with the received response. For example, the request may be associated with the socket on which the system received the response. Continuing in block 350, the system responds to the identified original request based on the received response. For example, the system may provide the received response and substitute the original requestor's Internet Protocol (IP) address and port for the cache server's in the response.

Continuing in block 360, the system identifies any held additional requests. For example, the system may have held requests that the system received between the time of the first request and the response to the first request. Continuing in block 370, if there are no held requests, then the system completes, else the system continues in block 380. For a live broadcast, there will likely be many held requests because the system receives many requests at close to the same time. Continuing in block 380, the system provides the received response to each of the held requests in much the same way as the system provides the response to the original request. However, because each request does not forward a request to the origin server and receives its own response, the system greatly reduces the burden on the origin server. After block 380, these steps conclude.

Figure 4:
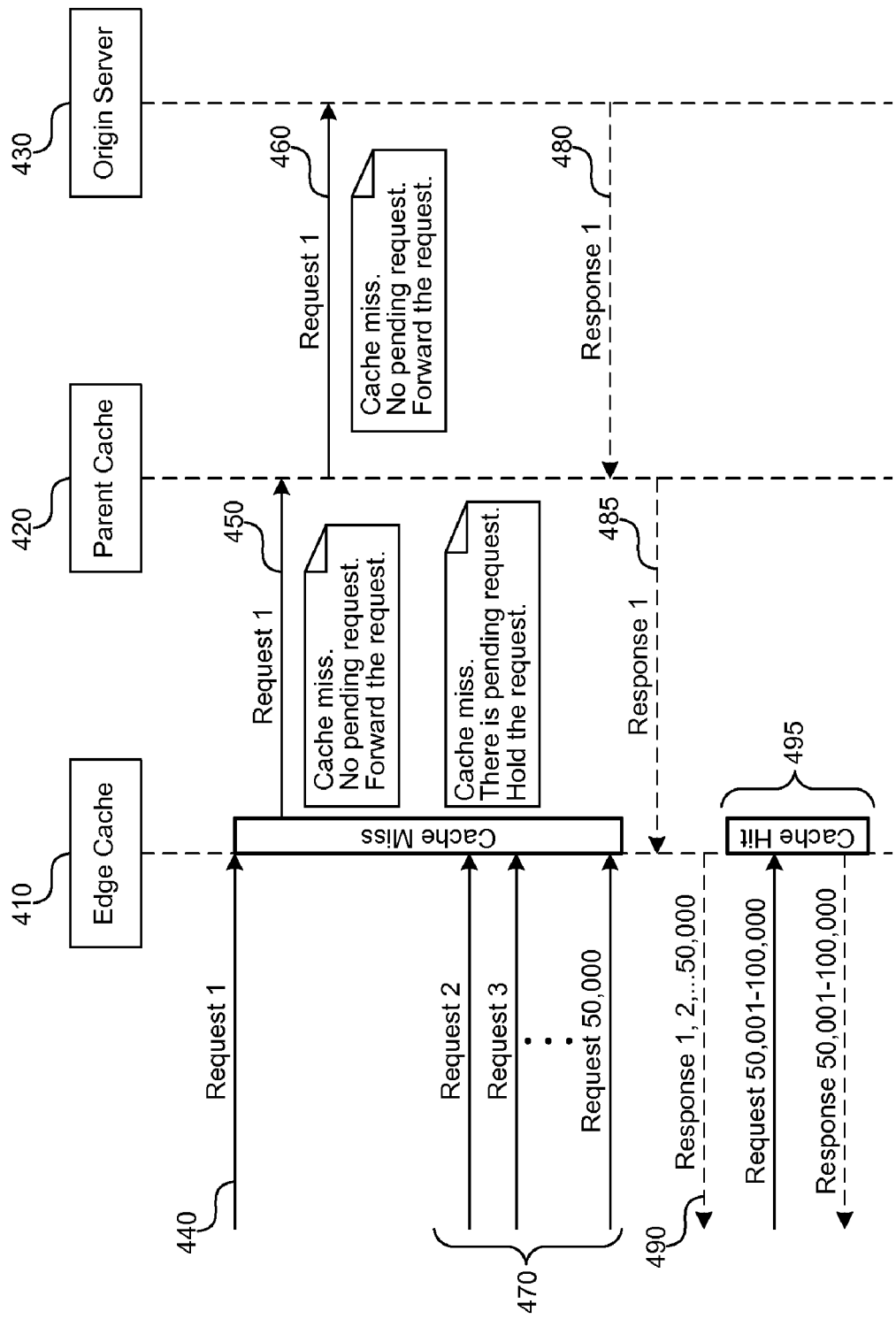
FIG. 4 is a sequence diagram that illustrates communications between servers, in one embodiment.

FIG. 4 is a sequence diagram that illustrates communications between servers, in one embodiment. The diagram shows network traffic between an edge cache 410, parent cache 420, and origin server 430 for 100,000 requests received at the edge cache 410 for the same content. The edge cache 410 receives a first request 440. In response to determining that the requested content is not in the cache of the edge cache 410, the edge cache 410 forwards the request 450 to the parent cache 420. The parent cache 420 also determines that the content is not in the cache of the parent cache 420, and forwards the request 460 to the origin server 430. The origin server 430 contains the content, and provides a response 480 with the requested content to the parent cache 420. The parent cache 420 adds the content to its cache and forwards the response 485 to the edge cache 410.

During this process, the edge cache 410 received 49,999 additional requests 470, but held the requests at the edge cache 410 in anticipation of the response 485 without contacting the parent cache 420 or origin server 430. After the edge cache 410 receives the response 485, the edge cache 410 provides individual responses 490 to each of the pending requests 440 and 470. Later, additional requests 495 arrive at the edge cache 410 for the same content, and the edge cache 410 responds from its cache without contacting the parent cache 420 or origin server 430. The edge cache 410 employs the system described herein (and the parent cache 420 may or may not also employ the system in the example shown). The system allows the edge cache 410 to provide caching both in typical scenarios that distinguish the initial 50,000 requests from the later 50,000 requests based on the availability of the content in the cache, as well as in high-scale simultaneous request scenarios where a first request and subsequent 49,999 requests all arrive when the content is not available in the cache, but the system only forwards the first request to the origin server 430.

In some embodiments, the live caching system detects when a forwarded request has been lost and performs corrective action. For reliable protocols, such as Transmission Control Protocol (TCP), the system receives an indication (e.g., a TCP reset) when a connection is lost. When the system receives an indication that a connection has been lost, the system may send a failure response to all pending requests that were waiting on the response. Alternatively or additionally, the system may attempt to reestablish the connection or to connect to one or more alternate sources for responding to the request. For example, a CDN may provide multiple origin servers or cache servers at any given tier. For unreliable protocols, such as Uniform Datagram Protocol (UDP), they system may automatically retry sending the request over the original connection one or more times before trying alternate sources or failing the request. Those of ordinary skill in the art will recognize numerous common techniques for responding to these and other network failures.

In some embodiments, the live caching system receives requests for media fragments that represent individually cacheable segments of a larger media presentation. For example, an origin server may provide a streaming audiovisual presentation as a series of multiple fragments each with its own URL that clients can request. In this way, clients can request a streaming presentation in a way that allows a stateless connection at each edge server and with the origin server so that each individual fragment is a separate cacheable entity. When a live presentation begins, the live caching system allows multiple clients requesting the same initial media fragment(s) at the same time to benefit from caching and to reduce the load on the origin server for handling each of the clients.

In some embodiments, the live caching system provides caching in scenarios where only a partial response has been provided by the origin server to one or more edge servers. Typically, a cache server cannot cache a response until the entire response has been received by the cache server. For example, when a client requests a large service pack via HTTP to update software on the client, the client typically makes one request for a file containing the service pack and the origin server provides one large response (albeit in potentially thousands of packets). Using the techniques described herein, the system can provide caching as the cache server is still receiving the response to the first request, rather than waiting until the cache server has received an entire complete response.

From the foregoing, it will be appreciated that specific embodiments of the live caching system have been described herein for purposes of illustration, but that various modifications may be made without deviating from the spirit and scope of the invention. For example, although particular protocols or media types have been used in examples herein, those of ordinary skill in the art will appreciate that the system can be used with many protocols and media types in addition to those described. Accordingly, the invention is not limited except as by the appended claims.

We claim:

1. A computer-implemented method for handling requests for live media events, the method comprising:
   receiving a request for media content;
   identifying a cache key based on distinguishing information in the received request;
   looking up the identified key in a cache within a live caching system to determine whether the requested media content is stored in the cache;
   determining whether there is a pending request for the same media content requested by the received request; and
   in response to determining that the requested media content is not stored in the cache and that there is a pending request for the same media content,
      waiting for a response to the pending request without forwarding the received request to an origin server; and
      receiving a response to the pending request; and
      responding to both the received request and the pending request using the received response,
   wherein the preceding steps are performed by at least one processor.

2. The method of claim 1 wherein the received request includes a URL and identifying a cache key comprises deriving the key from the URL.

3. The method of claim 1 wherein the cache includes a hash table, and the key acts as a hash value for looking up content in the cache.

4. The method of claim 1 wherein determining whether there is a pending request comprises using the identified cache key to identify any potential pending requests.

5. The method of claim 1 further comprising, in response to determining that there is not a pending request, forwarding the received request to another server that can provide the requested media content.

6. The method of claim 1 further comprising, in response to determining that the requested media content is stored in the cache, providing a response to the received request based on cached media content.

7. The method of claim 1 further comprising detecting that the pending request did not reach a destination and sending the pending request to a new destination to retrieve the media content.

8. The method of claim 1 wherein the received request identifies a media fragment of a media presentation, and wherein each media fragment is individually cacheable.

9. The method of claim 1 wherein the cache includes media content stored for partially received responses, and wherein the received request identifies media content for which the cache includes at least part of the media content responsive to the request.

10. A live caching system for caching requests on a network for live media events, the system comprising:
    a memory;
    a request component that receives a request for content from one or more clients over the network;
    a matching component that identifies a cache key based on distinguishing information in the received request and looks up the identified cache key in a cache within the live caching system to determine whether the requested media content is stored in the cache;
    a forwarding component that determines whether there is a pending request for the same media content requested by the received request; and in response to determining that the requested media content is not stored in the cache and that there is a pending request for the same media content waits for a response to the pending request without forwarding the received request to an origin server; and
    a response component that receives a response from the origin server to the pending request and responds to a client associated with the received request and a client associated with the pending request using the received response.

11. The system of claim 10 wherein the system operates as an HTTP cache and wherein the request component receives HTTP requests that specify a URL that a client is requesting to retrieve.

12. The system of claim 10 wherein the request component parses a protocol of a received request, retrieves distinguishing information from the request, and provides the distinguishing information to the matching component.

13. The system of claim 10 wherein the matching component receives a key derived from a URL, identifies matching content in the cache, and provides an HTTP response based on the identified matching content.

14. The system of claim 10 further comprising a data store component that stores responses to previous requests and provides fast access to respond to subsequent requests from the cache rather than forwarding a request to the origin server or other next tier server.

15. The system of claim 10 wherein the forwarding component routes requests to a next tier based on a content delivery network that specifies a defined hierarchy of cache servers and origin servers for providing content.

16. The system of claim 10 wherein the forwarding component places a placeholder in the cache that subsequently received requests use to determine that a pending request for content identified by the placeholder is in progress.

17. The system of claim 10 wherein the response component identifies one or more requests associated with a response, and replies to one or more senders of the requests based on the response.

18. The system of claim 10 wherein the response component adds received responses to the cache so that the system can serve subsequent requests for content of the response from the cache.

19. The system of claim 10 wherein the system is part of a multi-server system that uses HTTP-based caching for delivering a live media event.

20. A tangible computer-readable storage medium comprising instructions for handling requests for live media events, wherein the instructions, when executed, cause a processor to perform actions comprising:

receiving a request for media content;

identifying a cache key based on distinguishing information in the received request;

looking up the identified key in a cache within a live caching system to determine whether the requested media content is stored in the cache;

determining whether there is a pending request for the same media content requested by the received request; and in response to determining that the requested media content is not stored in the cache and that there is a pending request for the same media content, waiting for a response to the pending request without forwarding the received request to an origin server; and receiving a response to the pending request; and responding to both the received request and the pending request using the received response.

\* \* \* \* \*